United States Patent
Bhushan et al.

(10) Patent No.: US 11,134,449 B2
(45) Date of Patent: Sep. 28, 2021

(54) CONTROLLING TRANSMISSION POWER ACROSS BASIC SERVICE SETS (BSSS)

(71) Applicant: QUALCOMM Incorporated, San Diego, CA (US)

(72) Inventors: Bharat Bhushan, Fremont, CA (US); Avneet Kaur Puri, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 16/437,592

(22) Filed: Jun. 11, 2019

(65) Prior Publication Data

US 2020/0396695 A1 Dec. 17, 2020

(51) Int. Cl.
| | |
|---|---|
| *H04W 52/24* | (2009.01) |
| *H04W 72/04* | (2009.01) |
| *H04W 88/08* | (2009.01) |
| *H04B 17/318* | (2015.01) |
| *H04B 17/336* | (2015.01) |
| *H04L 1/00* | (2006.01) |

(52) U.S. Cl.
CPC ........ *H04W 52/243* (2013.01); *H04B 17/318* (2015.01); *H04B 17/336* (2015.01); *H04L 1/0003* (2013.01); *H04W 52/241* (2013.01); *H04W 72/0473* (2013.01); *H04W 88/08* (2013.01)

(58) Field of Classification Search
CPC ............. H04W 52/243; H04W 52/241; H04W 72/0473; H04W 88/08; H04W 52/262; H04W 52/225; H04W 52/383; H04W 52/34; H04B 17/318; H04B 17/336; H04L 1/0003
See application file for complete search history.

(56) References Cited

U.S. PATENT DOCUMENTS

| | | |
|---|---|---|
| 9,854,607 B1 | 12/2017 | Chu et al. |
| 2004/0170140 A1* | 9/2004 | Backes ................ H04W 52/24 370/331 |

(Continued)

OTHER PUBLICATIONS

International Search Report and Written Opinion—PCT/US2020/033146—ISAEPO—dated Aug. 18, 2020.

*Primary Examiner* — Ashley Shivers
(74) *Attorney, Agent, or Firm* — Qualcomm Incorporated

(57) ABSTRACT

This disclosure provides systems, methods and apparatuses, including computer programs encoded on computer-readable media, for controlling transmission power in a network having multiple access points (APs). In one aspect, by enabling control of transmission power adjustment operations, APs can effectively delivery data to stations (STAs) within the basis service set (BSS) in a manner that minimizes co-channel interference between nearby APs in the network. The transmission power adjustment operations may be used to generate an interference reduction plan that accounts for some or all of the traffic patterns in the network, the capacities of the APs in the network and the service needs of all the STAs in the network. In this manner, APs are afforded a more lenient approach to adequately delivering data to STAs within the BSS, while mitigating interference with other APs or STAs operating in nearby wireless coverage areas.

30 Claims, 9 Drawing Sheets

(56) References Cited

U.S. PATENT DOCUMENTS

2015/0237639 A1* 8/2015 Garrett .................. H04L 1/0003
370/329
2016/0037459 A1* 2/2016 Swartz .................. H04W 52/50
370/329

* cited by examiner

CONTROLLING TRANSMISSION POWER ACROSS BASIC SERVICE SETS (BSSS)

TECHNICAL FIELD

This disclosure relates generally to the field of wireless communication, and more particularly, to controlling transmission power in a multiple access point (AP) environment.

DESCRIPTION OF THE RELATED TECHNOLOGY

A wireless local area network (WLAN) may be formed by one or more access points (APs) that provide a shared wireless medium for use by a number of client devices. Each AP, which may correspond to a Basic Service Set (BSS), periodically broadcasts beacon frames to enable compatible client devices within wireless range of the AP to establish and maintain a communication link with the WLAN. WLANs that operate in accordance with the IEEE 802.11 family of standards are commonly referred to as Wi-Fi networks, and client devices that communicate with APs in a Wi-Fi network may be referred to as wireless stations (STAs). APs and STAs are capable of operating on a number of different frequency bands including, for example, the 2.4 GHz frequency band, the 5 GHz frequency band, the 6 GHz frequency band, and the 60 GHz frequency band. In some WLANs, each STA is associated with a single AP at a time and relies upon its associated AP to receive data.

In some implementations, a plurality of APs may be connected together to form an extended BSS (ESS) in a multi-AP environment. For example, many office and home wireless networks configured to operate as an ESS may include a root AP and a number of satellite APs such as relay or repeater APs. The root AP may provide a back-haul connection to other networks (such as the Internet), and the repeater APs may extend the effective wireless coverage area of the root AP. In some other implementations, a plurality of APs may be configured to operate as a mesh network. In a mesh network, the APs may be directly connected to each other in a non-hierarchical manner that allows the APs to cooperate with each other to efficiently route data to and from STAs. Mesh networks can dynamically self-organize and self-configure, which may reduce installation overhead and allow for the dynamic load balancing in the network. Some mesh networks may be referred to as Self-Organizing Networks (SONs). When neighboring APs in a multi-AP environment are operating on the same channel, co-channel interference may occur, and throughput and goodput may be adversely impacted.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of adjusting transmission power for a selected access point (AP) in a multi-AP environment. The method may include obtaining one or more frames from a plurality of stations (STAs) within the multi-AP environment, where the one or more frames includes a signal-to-noise (SNR) value; determining an average SNR value obtained from the plurality of STAs; and comparing the average SNR value to a threshold SNR value range. If the average SNR value exceeds the threshold SNR value range, the method includes reducing transmission power of the selected AP within the multi-AP environment. Conversely, if the average SNR value is below the threshold SNR value range, the method includes increasing transmission power of the selected AP within the multi-AP environment.

In some implementations, reducing transmission power occurs iteratively until the average SNR value resides in the threshold SNR value range. In some implementations, the transmission power can be iteratively reduced by 1 decibel per milliwatt (dBm).

In some implementations, increasing transmission power occurs iteratively until the average SNR value resides in the threshold SNR value range. In some implementations, the transmission power can be iteratively increased by 1 dBm.

In some implementations, the threshold SNR value range can be determined based on a modulation and coding scheme (MCS) index table. In some implementations, the MCS index table includes one or more, or any combination thereof, of the following values: modulation values, coding values, spatial stream values, data rate values, and received signal strength indicator (RSSI) values. In some implementations, if the average SNR value exceeds the threshold SNR value range, the method includes selecting a different modulation value than a current modulation value utilized by the selected AP; or selecting a different coding value than a current coding value utilized by the selected AP.

In some implementations, the multi-AP environment is part of a self-organizing network (SON). In some implementations, a SON Controller compares the average SNR value to the threshold SNR value. In some implementations, such as when the average SNR value exceeds the threshold SNR value range, the SON Controller reduces the transmission power of the selected AP within the multi-AP environment. In some other implementations, such as when the average SNR value falls below the threshold SNR value range, the SON Controller increases the transmission power of the selected AP within the multi-AP environment.

In some implementations, when the SNR value for a STA in the plurality of STAs is a defined percentage below the average SNR value obtained from the plurality of STAs, the method includes sending a message from the selected AP to a second AP in the multi-AP environment; and sending a steering request to the STA, where the steering request instructs the STA to join a Basic Service Set (BSS) of the second AP. In some implementations, the message indicates that the selected AP is reducing the transmission power to its BSS, and the SNR value for the STA is more than the defined percentage below the average SNR value obtained from the plurality of STAs within its BSS. In some implementations, the message informs the second AP that the steering request instructs the STA to join the BSS of the second AP.

Another innovative aspect of the subject matter described in this disclosure can be implemented in an access point (AP) for performing a transmission power adjustment operation in a multi-AP environment. The AP includes a first interface configured to obtain one or more frames from a plurality of stations (STAs) within the multi-AP environment, where the one or more frames includes a signal-to-noise (SNR) value; and a processing system configured to: determine an average SNR value of the one or more frames obtained from the plurality of STAs; compare the average SNR value to a threshold SNR value range; and reduce the transmission power if the average SNR value exceeds the threshold SNR value range; or increase the transmission power if the average SNR value is below the threshold value range.

In some implementations, the reducing the transmission power or the increasing the transmission power occurs iteratively until the average SNR value resides in the threshold SNR value range.

In some implementations, the threshold SNR value range is determined based on a modulation and coding scheme (MCS) index table. In some implementations, the MCS index table includes one or more, or any combination thereof, of the following values: modulation values, coding values, spatial stream values, data rate values, and received signal strength indicator (RSSI) values. In some implementations, if the average SNR value exceeds the threshold SNR value range, the processing system is further configured to select a different modulation value than a current modulation value employed by the AP, or select a different coding value than a current coding value employed by the AP.

In some implementations, such as when the SNR value for a STA in the plurality of STAs is a defined percentage above or below the average SNR value obtained from the plurality of STAs, the processing system is further configured to: send a message to a second AP in the multi-AP environment; and send a steering request to the STA, where the steering request instructs the STA to join a Basic Service Set (BSS) of the second AP.

The AP can be implemented to perform any of the aspects of the innovative method described above.

Another innovative aspect of the subject matter described in this disclosure can be implemented in a computer-readable medium having instructions stored therein to cause a processor of an access point (AP), operating within a multi-AP environment, to obtain one or more frames from a plurality of stations (STAs), where the one or more frames includes a signal-to-noise (SNR) value; determine an average SNR value obtained from the plurality of STAs; and compare the average SNR value to a threshold SNR value range. If the average SNR value exceeds the threshold SNR value range, the processor of the AP can reduce a transmission power to one or more of the plurality of STAs. Conversely, if the average SNR value is below the threshold SNR value range, the processor of the AP can increase the transmission power to one or more of the plurality of STAs.

In some implementations, the processor of the AP can reduce the transmission power or increase the transmission power iteratively by 1 decibel per milliwatt (dBm).

In some implementations, when the SNR value for a STA in the plurality of STAs is a defined percentage below or above the average SNR value obtained from the plurality of STAs, the processor of the AP can be further configured to: send a message to a second AP in the multi-AP environment; and send a steering request to the STA, where the steering request instructs the STA to join a Basic Service Set (BSS) of the second AP. In some implementations, the message can indicate that the AP is reducing the transmission power to its BSS, and the SNR value for the STA is more than the defined percentage below or above the average SNR value obtained from the plurality of STAs within its BSS; and can inform the second AP that the steering request instructs the STA to join the BSS of the second AP.

Another innovative aspect of the subject matter described in this disclosure can be implemented in an access point (AP) for performing a transmission power adjustment operation in a multi-AP environment. The AP includes one or more processors and a memory storing instructions. When the instructions are executed by the one or more processors, the AP can be implemented to obtain one or more frames from a plurality of stations (STAs) within the multi-AP environment, where the one or more frames includes a signal-to-noise (SNR) value; determine an average SNR value obtained from the plurality of STAs; and compare the average SNR value to a threshold SNR value range. If the average SNR value exceeds the threshold SNR value range, the AP can be implemented to reduce a transmission power to one or more of the plurality of STAs. Alternatively, if the average SNR value is below the threshold SNR value range, the AP can be implemented to increase the transmission power to one or more of the plurality of STAs.

In some implementations, the threshold SNR value range is determined based on a modulation and coding scheme (MCS) index table. In some implementations, if the average SNR value exceeds the threshold SNR value range, the one or more processors can cause the AP to select a different modulation scheme or a different coding scheme from the MCS index table.

In some implementations, the multi-AP environment is part of a self-organizing network (SON). In some implementations, when the SNR value for a STA in the plurality of STAs is a defined percentage above or below the average SNR value obtained from the plurality of STAs, the one or more processors cause the AP to send a message from to a second AP in the multi-AP environment; and send a steering request to the STA, where the steering request instructs the STA to join a Basic Service Set (BSS) of the second AP.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
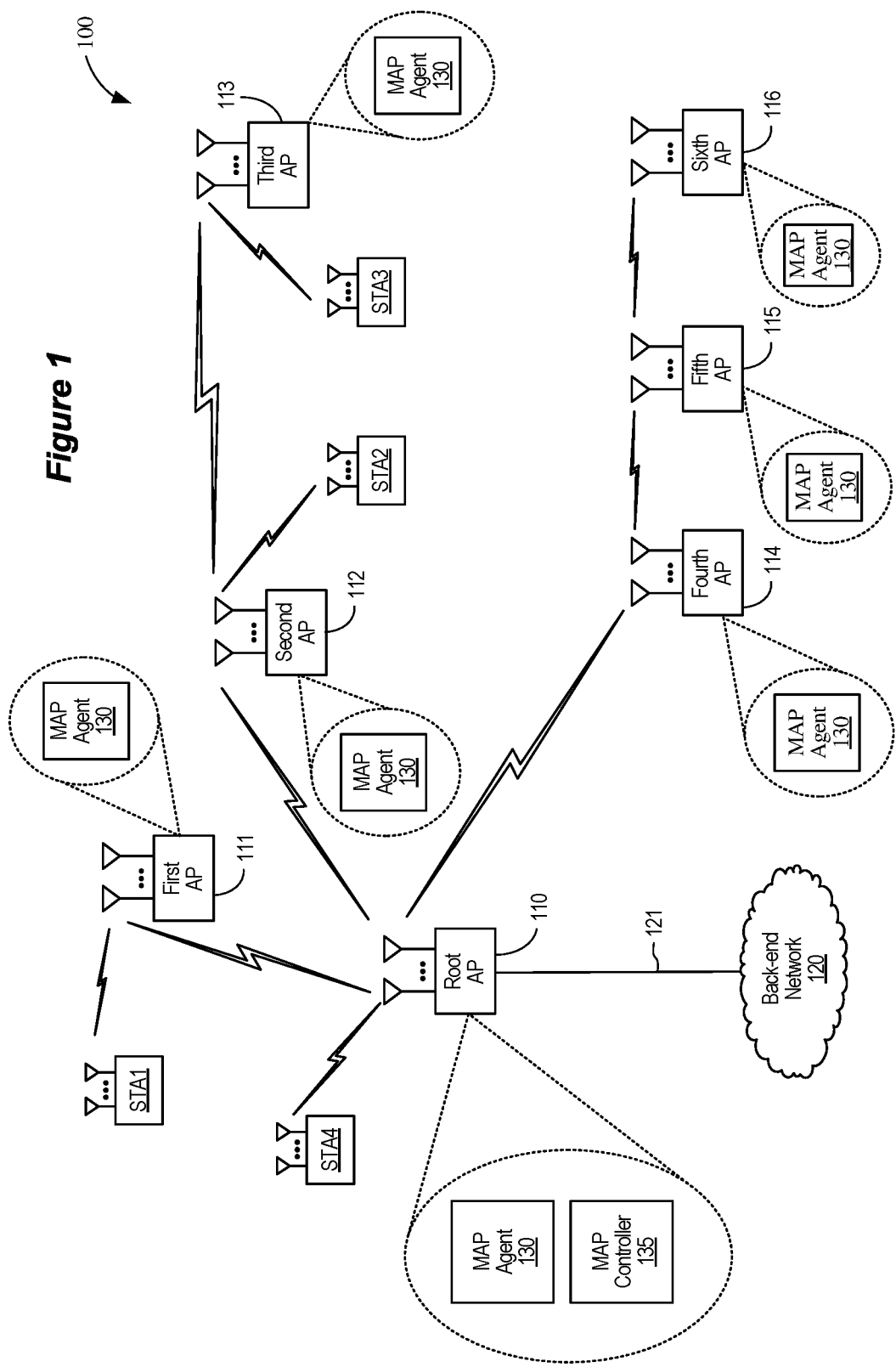
FIG. 1 shows an example wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards (i.e., Wi-Fi), the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the IEEE 802.15 Bluetooth® standards, Bluetooth low energy (BLE), code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G, 5G, or 6G, or further implementations thereof, technology.

A local network in a home, apartment, business, or other area may include a variety of devices that utilize the local network to communicate with each other or with devices in another network. For example, the local network may provide access for local devices to communicate to an upstream network (such as access to the Internet, via a broadband network). The local network may include one or more access points (APs), in a multi-AP environment, to provide wireless coverage for the local network. Typically, one of the APs will be referred to as a root AP, while other APs make automatic path or routing selection using a logical topology between each of the other APs and the root AP. A local network which is capable of coordinating between two or more APs to manage a topology or aggregate wireless coverage area may be referred to as a self-organizing network (SON). A SON protocol may be used between the two or more APs to coordinate wireless channel configurations or other implementation settings.

Channel selection is a mechanism through which an AP may select an operating channel for its wireless coverage area. In some implementations, the AP may select its operating channel from a set of available channels associated with one or more frequency bands supported by the AP. In a wireless network including multiple APs that may have overlapping wireless coverage areas, it is desirable to coordinate the selection of operating channels used by nearby APs to minimize co-channel interference between nearby APs. In some aspects, nearby APs may use the same operating channel if the co-channel interference is below a threshold value (such that interference between the nearby APs is minimal or is at least acceptable). In some other aspects, nearby APs may not use the same operating channel if the co-channel interference is above a threshold value (such that interference between the nearby APs degrades performance or is unacceptable).

In some implementations, such as in a densely populated neighborhood, apartment complex or office space, where each house, apartment unit or office has an AP, or multiple APs, neighboring units may be forced to share the same operating channel due to a limited number of channels being available in the densely packed environment. As such, co-channel interference can be especially problematic where multiple APs have overlapping wireless coverage areas. APs often use high power amplification tools in an effort to increase wireless coverage areas, but this approach only further exacerbates co-channel interference in a multi-AP environment. The co-channel interference can cause increased latencies in data transmission, and adversely impact user experience.

Implementations of the subject matter described in this disclosure can be used to perform transmission power adjustment operations that enable APs to deliver data to stations (STAs) within the Basic Service Set (BSS) in a manner that minimizes co-channel interference between nearby APs in the network. The transmission power adjustment operations may be used to generate an interference reduction plan that accounts for some or all of the traffic patterns in the network, the capacities of the APs in the network and the service needs of all the STAs in the network. In this manner, APs are afforded a more lenient approach to adequately delivering data to STAs within the BSS, while mitigating interference with other APs or STAs operating in nearby wireless coverage areas.

Particular implementations of the subject matter described in this disclosure can be implemented to realize one or more of the following potential advantages. By employing transmission power adjustment operations within a multi-AP environment, APs can be configured to deliver the optimum transmission power to STAs within the AP's BSS. Additionally, co-channel interference across wireless coverage areas can be reduced. Reductions in co-channel interference may result in higher throughput, higher goodput, and lower latencies in data transmission. As a corollary, user experience at the STAs may be improved. Additionally, controlling the transmission power of APs in a multi-AP environment may mitigate, or altogether eliminate, "dead zones," i.e., where wireless reception is deficient or not present, because AP nodes may be placed anywhere within the multi-AP environment without concern about co-channel interference from neighboring nodes.

In the following description, numerous specific details are set forth such as examples of specific components, circuits, and processes to provide a thorough understanding of the present disclosure. The term "coupled" as used herein means connected directly to or connected through one or more intervening components or circuits. The term "associated AP" refers to an AP with which a given STA is associated (such as there is an established communication channel or link between the AP and the given STA). The term "non-associated AP" refers to an AP with which a given STA is not associated (such as there is not an established communication channel or link between the AP and the given STA, and thus the AP and the given STA may not yet exchange data frames). The non-associated APs also may be referred to herein as "candidate APs," and thus the terms "non-associated AP" and "candidate AP" may be used interchangeably herein. The term "obstruction," as used herein, refers to any source of interference (such as physical objects or electromagnetic waves) that may inhibit or degrade wireless communications between a STA and an AP. In addition, although described herein in terms of exchanging data frames between wireless devices, the implementations may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs).

FIG. 1 shows a block diagram of an example wireless system 100. The wireless system 100 is shown to include a number of wireless access points (APs) 110-116 and a number of wireless stations (STAs) STA1-STA4. The APs 110-116 may form a wireless local area network (WLAN)

that allows the APs 110-116, the stations STA1-STA4, and other wireless communication devices (not shown for simplicity) to communicate with each other over a shared wireless medium. The shared wireless medium may be divided into a number of channels, may be divided into a number of resource units (RUs), or both. The APs 110-116 may each include an assigned unique MAC address that is programmed therein by, for example, the manufacturer of the access point. Similarly, each of the stations STA1-STA4 also may be assigned a unique MAC address. In some implementations, the wireless system 100 may correspond to a multiple-input multiple-output (MIMO) wireless network and may support single-user MIMO (SU-MIMO) and multi-user (MU-MIMO) communications. In some implementations, the wireless system 100 may support orthogonal frequency-division multiple access (OFDMA) communications.

In some implementations, access to the shared wireless medium is governed by a Distributed Coordination Function (DCF). With a DCF, there is no centralized master device allocating time and frequency resources of the shared wireless medium. On the contrary, before a wireless communication device, such as the APs 110-116 or the stations STA1-STA4, is permitted to transmit data, it must wait for a particular time and then contend for access to the wireless medium. In some implementations, the wireless communication device may be configured to implement the DCF through the use of Carrier Sense Multiple Access (CSMA) with Collision Avoidance (CA) (CSMA/CA) and timing intervals. Before transmitting data, the wireless communication device performs a Clear Channel Assessment (CCA) and determines that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. If the received signal strength is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a Network Allocation Vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

The DCF is implemented through the use of time intervals. These time intervals include the slot time (or slot interval) and the Inter-Frame Space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11n, 802.11ac, 802.11ah, 802.11ad, 802.11ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder of a Transmit Opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication devices generates a new physical layer convergence protocol (PLCP) protocol data unit (PPDU) for transmission in a new TXOP, it randomly selects a new backoff timer duration. The available distribution of the numbers that may be randomly selected for the backoff timer is referred to as the Contention Window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PPDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four Access Categories (ACs): voice (AC_VO), video (AC_VI), background (AC_BK), and best effort (AC_BE). This enables particular types of traffic to be prioritized in the network.

The wireless system 100, or wireless communication network, in addition to an example of a WLAN, also can be an example of a wireless personal area network (PAN). In some implementations, the wireless system 100 can be implemented as an ad hoc, peer-to-peer (P2P), or mesh network. In some implementations, the wireless system 100 is a Wi-Fi network and defined by the IEEE 802.11 family of standards. In some other implementations, the wireless system 100 is an example of a Bluetooth® network and the stations STA1-STA4 are Bluetooth®-compliant devices. In some additional implementations, the wireless system 100 can include one or more of the following wireless communication technologies: Bluetooth Low Energy (BLE), BLE mesh, ZigBee, Low Power IoT, LTE or 5G. Furthermore, in some implementations, the wireless system 100 can be implemented as a hybrid network, and can support both wired and wireless communication technologies, multiple wired communication technologies, or multiple wireless communication technologies. For example, one or more of the APs 110-116 can support both IEEE 802.11 and powerline communication (PLC) protocols. In some other examples, the APs 110-116 can support a combination of IEEE 802.11 and PLC protocols, a combination of IEEE 802.11 and coaxial cable (Coax) based communication protocols, a combination of IEEE 802.11 and Ethernet based communication protocols, a combination of IEEE 802.11 and Bluetooth communication protocols, a combination of IEEE 802.11 and LTE communication protocols, a combination of IEEE 802.11 and 5G communication protocols, and various other suitable combinations.

The stations STA1-STA4 may be any suitable wireless communication electronic device. The wireless communication electronic devices also may be known as electronic devices. An electronic device also may be referred to as a user equipment (UE), a smartphone, a mobile device, wireless device, a wireless node, a receiver device, a remote device, a handheld device, or a subscriber device, or some other suitable terminology, where the "device" also may be referred to as a unit, a terminal, or a client. The electronic device may be implemented as any computing device configured to receive, process and otherwise handle information, including audio or visual or audio/visual (i.e., video), over a communications network. The electronic device also may be a cellular phone, a personal digital assistant (PDA), a laptop or laptop computer, a tablet device, a personal computer, a gaming console, a virtual or augmented reality device, a drone, an Internet of Things (IoT) device, or other electronic system. IoT devices also may be referred to as an Internet of Everything (IoE) device, an IoT hub, and IoE hub, or any other physical device, vehicle, or home appliance that is embedded with electronics and network connectivity, which enable these objects to connect and exchange data. The IoT device also may be referred to as a virtual assistant device, such as Amazon Alexa®, Google Home®, etc., a wearable device, such as smart watches, Google Glass®, etc., an in-vehicle entertainment or communication system, a home security system, or any device having an interface, such as a network interface, to a communications network and suitable input and output devices. Wearable devices also may be referred to as wearable technology, wearable gadgets, wearables, or some other suitable terminology, which generally describes electronics and software-based technology that is worn on the body, either as an accessory, or as part of material used in clothing. Additionally, the electronic device can be implemented as a display device (for example, TVs, computer monitors, navigation systems, among others), music or other audio or stereo devices (for example, audio headphones or ear buds), remote control devices (i.e., remotes), printers, copiers, kitchen or other household appliances, and key fobs (such as for passive keyless entry and start (PKES) systems).

The APs 110-116 may be any suitable device that allows one or more wireless devices (such as the stations STA1-STA4) to connect to another network (such as a local area network (LAN), wide area network (WAN), metropolitan area network (MAN), or the Internet). In some implementations, each of the stations STA1-STA4 and each of the APs 110-116 may include one or more transceivers, one or more processing resources (such as processors or ASICs), one or more memory resources, and a power source (such as a battery for the stations STA1-STA4). The one or more transceivers may include Wi-Fi transceivers, Bluetooth transceivers, cellular transceivers, or other suitable radio frequency (RF) transceivers (not shown for simplicity) to transmit and receive wireless communication signals. In some implementations, each transceiver may communicate with other wireless devices in distinct frequency bands or using distinct communication protocols. The memory resources may include a non-transitory computer-readable medium (such as one or more nonvolatile memory elements, such as EPROM, EEPROM, Flash memory, a hard drive, etc.) that stores instructions for performing one or more operations described below with respect to FIGS. 5-7.

In some implementations, each of the APs 110-116 may periodically broadcast beacon frames to enable the stations STA1-STA4 and other wireless devices within their wireless ranges to establish and maintain a communication link with the respective one of the APs 110-116. The beacon frames, which are typically broadcast according to a target beacon transmission time (TBTT) schedule, may include timing synchronization function (TSF) values of one or more of the APs 110-116. The stations STA1-STA4 may synchronize their own local TSF values with the broadcast TSF values, for example, so that all the stations STA1-STA4 are synchronized with each other and with the APs 110-116. In some aspects, the beacon frames may indicate downlink (DL) data transmissions to the stations STA1-STA4, and may solicit or schedule uplink (UL) data transmissions from the stations STA1-STA4.

In some implementations, the AP 110 may operate as a root AP (RAP), and each of the APs 111-116 may operate as satellite APs (SAPs). In such implementations, the AP 110 may be referred to as the root AP 110, and each of the APs 111-116 may be referred to as a satellite AP (SAP). The root AP 110 may facilitate communications between the root AP 110 and the satellite APs 111-116, and also may facilitate communications between the WLAN and other networks or systems. In some aspects, the root AP 110 may be connected via a wired connection 121 (such as through an Ethernet or PLC), or alternatively, via a wireless connection, or even a hybrid communication link, to a back-end network 120 such as, for example, a LAN, WAN, MAN, a communication service provider network, the Internet, or any combination thereof. The root AP 110 may be a central access point or router which is communicatively coupled to the back-end network 120, or broadband network. Alternatively, the root AP 110 may be separate or collocated with a gateway device. A gateway device, such as a modem or router, may provide access to the back-end network 120. For example, the gateway device can couple to the back-end network 120 through a cable, a fiber optic, a powerline, or DSL network connection. The root AP 110 may be connected to each of the satellite APs 111-116 via either a wireless connection or a wired connection (not shown for simplicity).

In some implementations, the root AP 110 may be or may include a multi-AP (MAP) agent 130 and a MAP Controller 135. The MAP agent 130 may allow the root AP 110 to provide wireless services to a number of client devices (such as the stations STA1-STA4) and to communicate with one or more of the APs 111-116. The MAP Controller 135 may coordinate channel planning for the APs 110-116 and their associated client devices, and may configure one or more aspects of the downstream APs 111-116. In some implementations, the root AP 110 may use the MAP Controller 135 to steer one more of the stations STA1-STA4 to other APs or may steer one more of the APs 111-116 to other frequency bands (or both) based on a number of factors that may include, for example, changes in load balance on the APs 110-116, changes in traffic patterns of the network, changes in locations of the stations STA1-STA4, changes in bandwidth or service needs of the stations STA1-STA4, changes in channel conditions, changes in interference, changes in operating channels, changes in capacities of the APs 110-

116, changes in available airtime for the APs 110-116, or any combination thereof. In addition, or in the alternative, the root AP 110 may use the MAP Controller 135 to generate one or more channel selection plans for the network. The channel selection plans may be used to dynamically assign operating channels to the APs 111-116 in a manner that considers the impact that each of the APs 111-116 (as well as their respective client devices) may have on the network, thereby optimizing network performance.

Although depicted in the example of FIG. 1 as being part of the root AP 110, the MAP Controller 135 may be separate from the root AP 110. In some other implementations, the root AP 110 may include the MAP Controller 135 but may not include the MAP agent 130 (and may not provide wireless service to client devices such as the stations STA1-STA4).

Each of the satellite APs 111-116 may be or may include a MAP agent 130 that allows the satellite APs 111-116 to provide wireless services to a number of client devices (such as the stations STA1-STA4). The MAP agents 130 also may allow their corresponding satellite APs 111-116 to communicate with downstream satellite APs or with upstream satellite APs (or both). In some implementations, the satellite APs 111-116 may be used to extend the wireless coverage area of the root AP 110, for example, by operating as relay devices or range extender devices. In the example of FIG. 1, the root AP 110 and the satellite APs 111-116 are arranged in a tree topology in which the root AP 110 provides a connection between the WLAN and the back-end network 120, and the satellite APs 111-116 form various branches of the tree topology. For example, the first AP 111 forms a first branch of the tree topology, the second and third APs 112-113 form a second branch of the tree topology, and the fourth, fifth, and sixth APs 114-116 form a third branch of the tree topology. The first, second, and fourth APs 111, 112, and 114 are directly connected to the root AP 110, and therefore may be classified as 1-hop devices of the network. The third and fifth APs 113 and 115 are connected to the root AP 110 by intervening APs 112 and 114, respectively, and therefore may be classified as 2-hop devices of the network. The sixth AP 116 is connected to the root AP 110 by intervening APs 114 and 115, and therefore may be classified as a 3-hop device of the network.

For the example wireless system 100 of FIG. 1, the first station STA1 is currently associated with the first AP 111, the second station STA2 is currently associated with the second AP 112, the third station STA3 is currently associated with the third AP 113, and the fourth station STA4 is currently associated with the root AP 110. In some implementations, each of the root AP 110 and the satellite APs 111-116 may define its own Basic Service Set (BSS), and all client devices associated with a given AP may be included within the given AP's BSS. In some other implementations, the root AP 110 and a group of the satellite APs 111-116 may form an Extended Basic Services Set (ESS), and all client devices associated with the root AP 110 and the group of the satellite APs 111-116 may be included within the ESS.

The MAP Controller 135 may be used to assign operating channels for the root AP 110 and for one or more of the satellite APs 111-116 in a manner that optimizes network performance by considering the impact that each of the satellite APs 111-116 (as well as their respective client devices) may have on the network. In some implementations, the MAP Controller 135 may provide centralized channel selection planning for the network based a number of network parameters observed by one or more of the satellite APs 111-116. The network parameters may include, for example, channel conditions, interference, traffic loads, traffic patterns, service needs of client devices, available channels, and other network utilization information observed by one or more of the satellite APs 111-116. In some aspects, the satellite APs 111-116 may determine one or more network parameters and transmit the determined network parameters to the root AP 110, for example, as described with respect to FIGS. 5-7.

The MAP Controller 135 may collect the determined network parameters from the satellite APs 111-116 and use the determined network parameters to generate one or more transmission power adjustment plans for the network. In some implementations, the MAP Controller 135 may determine the optimum transmission power adjustment for one or more of the satellite APs 111-116 and deploy the transmission power adjustment plan across the network. The deployed transmission power adjustment plan may be used to mitigate co-channel interference in overlapping wireless coverage areas for the root AP 110 and the satellite APs 111-116.

In some other implementations, the APs 110-116 may be configured to operate as a mesh network. In a mesh network, the APs 110-116 may be directly connected to each other wirelessly in a non-hierarchical manner that allows the APs to cooperate with each other to efficiently route data to and from STAs. Some mesh networks may be referred to as Self-Organizing Networks (SONs). In a SON topology, the root AP 110 and the APs 111-116 do not need to be outfitted with a MAP agent 130, nor a MAP Controller 135. In some mesh network implementations, the root AP 110, or any of the APs 111-116, can be implemented as a SON Controller. In some implementations, the SON Controller may be configured to serve similar functions as the MAP Controller described above and throughout. In such implementations, the SON Controller may generate one or more transmission power adjustment plans for the network and may determine optimum transmission power adjustments for the APs in the mesh network.

Figure 2:
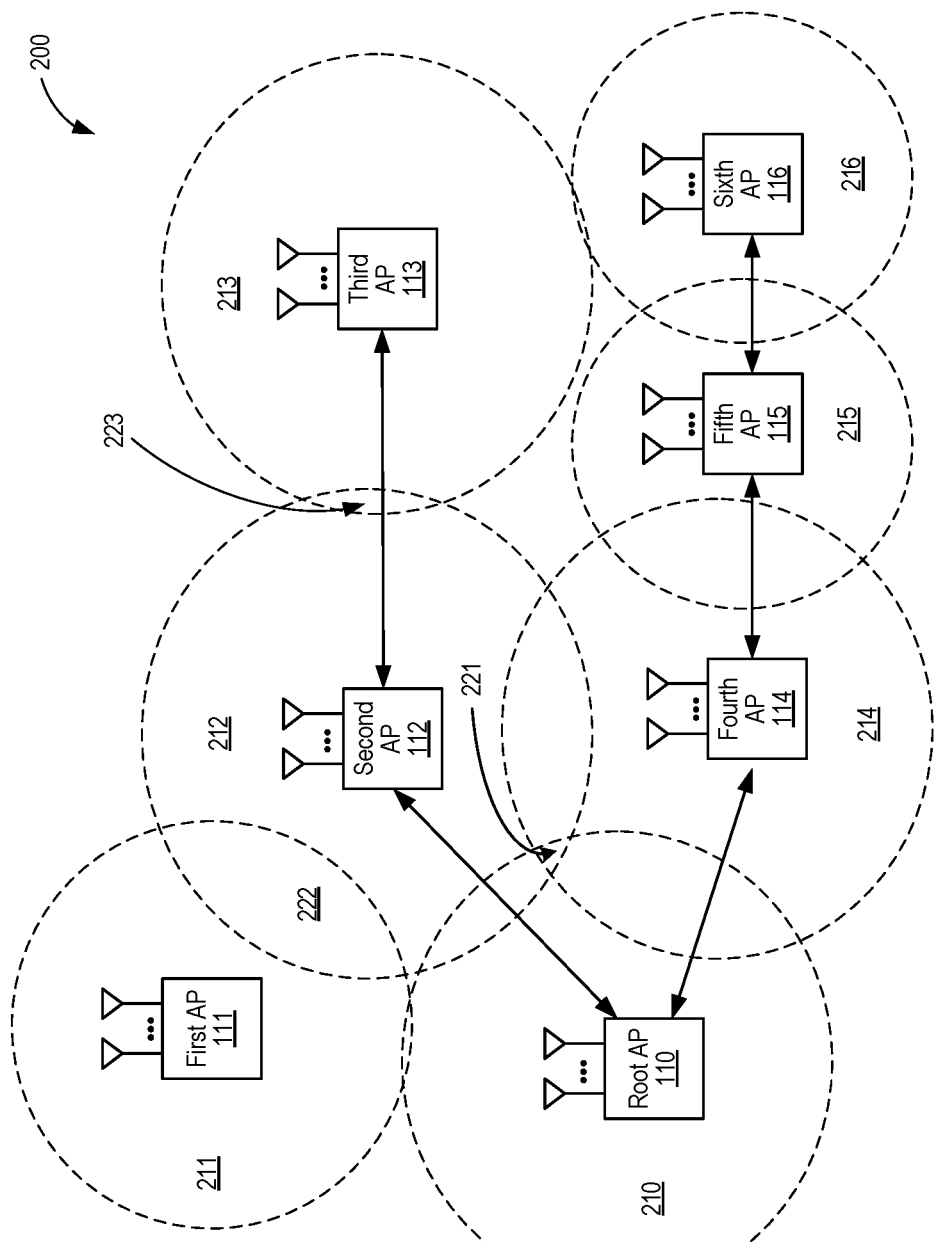
FIG. 2 shows example wireless coverage areas of the access points (APs) of FIG. 1.

FIG. 2 shows example wireless coverage areas 200 of the APs 110-116 of FIG. 1. For simplicity, the stations STA1-STA4 and the back-end network 120 are not shown in FIG. 2. The wireless coverage area provided by an AP may refer to a physical area in which the AP can exchange wireless signals with one or more other devices on a shared wireless medium. Each AP may not provide uniform wireless coverage within an environment, and the wireless coverage areas of nearby APs may be different due to many factors including, for example, wireless signal power levels, capabilities of the stations STA1-STA4, capabilities of the APs, frequency propagation, radio frequency (RF) interference, terrain, reflections, and so on. Therefore, a wireless coverage area may not be a precise distance from an AP. In addition, different wireless channels may be associated with different wireless coverage areas based on the environment or other APs in the network.

When a network includes multiple APs, it is desirable for nearby APs to avoid using the same channel. For example, co-channel interference may occur between two APs that are transmitting and receiving on the same channel. Co-channel interference can severely affect the performance of a wireless network. Therefore, an AP may select and use a channel that is not currently in use by a nearby AP. However, there may be a limited quantity of channels within a frequency band due to spectrum constraints. In a network having multiple APs, some APs may create overlapping wireless coverage areas using different channels. Furthermore, some APs may use the same channels using channel reuse. Channel reuse refers to the ability for a first AP and second AP to utilize the same channel when the co-channel interference between the first and second AP is sufficiently low. For example, channel reuse allows both the first and second AP to utilize the channel with acceptable amounts of co-channel interference. However, without coordination (or stability control techniques), an AP may perform a channel selection that adversely impacts another AP. In some networks, the channel selection may cause a chain reaction causing multiple APs to reselect new channels.

In the example of FIG. 2, the root AP 110 may be implemented as a MAP Controller or SON Controller and provide a root wireless coverage area 210; the first AP 111 may be implemented to manage a first WLAN, establish a first BSS, and provide a first wireless coverage area 211; the second AP 112 may be implemented to manage a second WLAN, establish a second BSS, and provide a second wireless coverage area 212; the third AP 113 may be implemented to manage a third WLAN, establish a third BSS, and provide a third wireless coverage area 213; the fourth AP 114 may be implemented to manage a fourth WLAN, establish a fourth BSS, and provide a fourth wireless coverage area 214; the fifth AP 115 may be implemented to manage a fifth WLAN, establish a fifth BSS, and provide a fifth wireless coverage area 215; and the sixth AP 116 may be implemented to manage a sixth WLAN, establish a sixth BSS, and provide a sixth wireless coverage area 216.

As shown in FIG. 2, some of the wireless coverage areas 210-216 may overlap each other. For example, the root wireless coverage area 210, the second wireless coverage area 212, and the fourth wireless coverage area 214 overlap each other in a first region 221; the first wireless coverage area 211 and the second wireless coverage area 212 overlap each other (but not the root wireless coverage area 210) in a second region 222; the second wireless coverage area 212 and the third wireless coverage area 213 overlap each other (but not the root wireless coverage area 210 or the first wireless coverage area 211) in a third region 223, and so on. In some implementations, the root AP 110 may cause or instruct a number of the APs 111-116 to operate on different operating channels to minimize channel degradation in one or more of the overlapping regions 221-226. For example, if the first wireless coverage area 211 uses a first channel and the second wireless coverage area 212 uses a second channel different than the first channel, then the degradation of the effective channel capacity of each of the first and second channels resulting from the overlapping second region 222 may be reduced. By selecting different channels for overlapping coverage areas, the effective channel capacity for each of the different channels is not affected (or minimally affected) by the overlapping coverage area.

In addition, or in the alternative, the root AP 110 may cause or instruct a number of the satellite APs 111-116 to operate on different operating channels to prevent channel reuse in one or more of the overlapping regions 221-226. For example, because the overlapping first region 221 includes a portion of the first wireless coverage area 211, a portion of the second wireless coverage area 212, and a portion of the root wireless coverage area 210, channel degradation in the overlapping first region 221 may be minimized if the root AP 110, the first AP 111, and the second AP 112 operate on different channels. In an optimal channel selection algorithm, there would be no channel reuse for overlapping coverage areas. However, sometimes it is unavoidable to reuse a same channel for an overlapping coverage area, such as when multiple APs in the network operate in proximity to each other. Furthermore, it may be desirable for some homes, apartments, buildings, or other environments to utilize many APs to provide wireless coverage throughout the environment.

Each of the APs 110-116 may be capable of scanning for a set of channels within a selected frequency band. However, without considering the impact of channel selection with respect to other APs, a channel selection by one AP may inadvertently impact the wireless coverage provided by another AP. For example, if the first AP 111 selects a channel for the first wireless coverage area 211 based only on channel conditions observed by itself, then network traffic and loading on that channel by neighboring APs, such as the root AP 110 and the second AP 112, may result in the selected channel having lower capacity than estimated by the first AP 111. More specifically, a channel selected by the first AP 111 may appear to be unutilized (or underutilized) in a wireless scan performed by the first AP 111. However, the same channel may appear to be heavily loaded (or incur significant interference) at the second AP 112. In some implementations, the loading or interference may be from a different network that is also operating within a coverage area of the second AP 112. The second AP 112 can be impacted in multiple ways depending on how it is utilizing its radios. For example, if the second AP 112 is using that channel for a backhaul channel from the second AP 112 to the first AP 111, then the second AP 112 may see higher packet errors on the backhaul channel due to a neighboring interferer that is unseen by the first AP 111. In another example, if the second AP 112 is using the channel for both backhaul and BSS service links, then the second AP 112 also may be constrained in the amount of traffic it can serve in its BSS (since the second AP 112 would be contending with the neighbor AP, even though the neighbor AP is unseen by the first AP 111).

Thus, when selecting a channel, the first AP 111 may benefit from obtaining channel condition information that is observable by other APs in the network (even if some of the channel conditions are not directly observable by the first AP 111). Furthermore, by coordinating enhanced channel selection between the first AP 111 and the root AP 110, the root AP 110 may select a better channel to maximize channel reuse within the network, such as when overlapping coverage areas are unavoidable. Maximizing channel reuse may improve the overall network capacity.

In some implementations, the APs 110-116 can be configured as dual band, dual concurrent (DBDC) wireless devices. A DBDC device can include two transceivers (which also may be referred to as radios) and can operate on two different frequency bands independently and simultaneously. For example, a first transceiver can operate in the 2.4 GHz frequency band and a second transceiver can operate in the 5 GHz frequency band. The two transceivers can be linked within the DBDC device such that data can be communicated between the transceivers. When using DBDC devices, additional considerations (such as regarding coexisting transceivers) may impact channel selection. Also, when using DBDC devices, additional network data pathway selections are possible.

Figure 3:
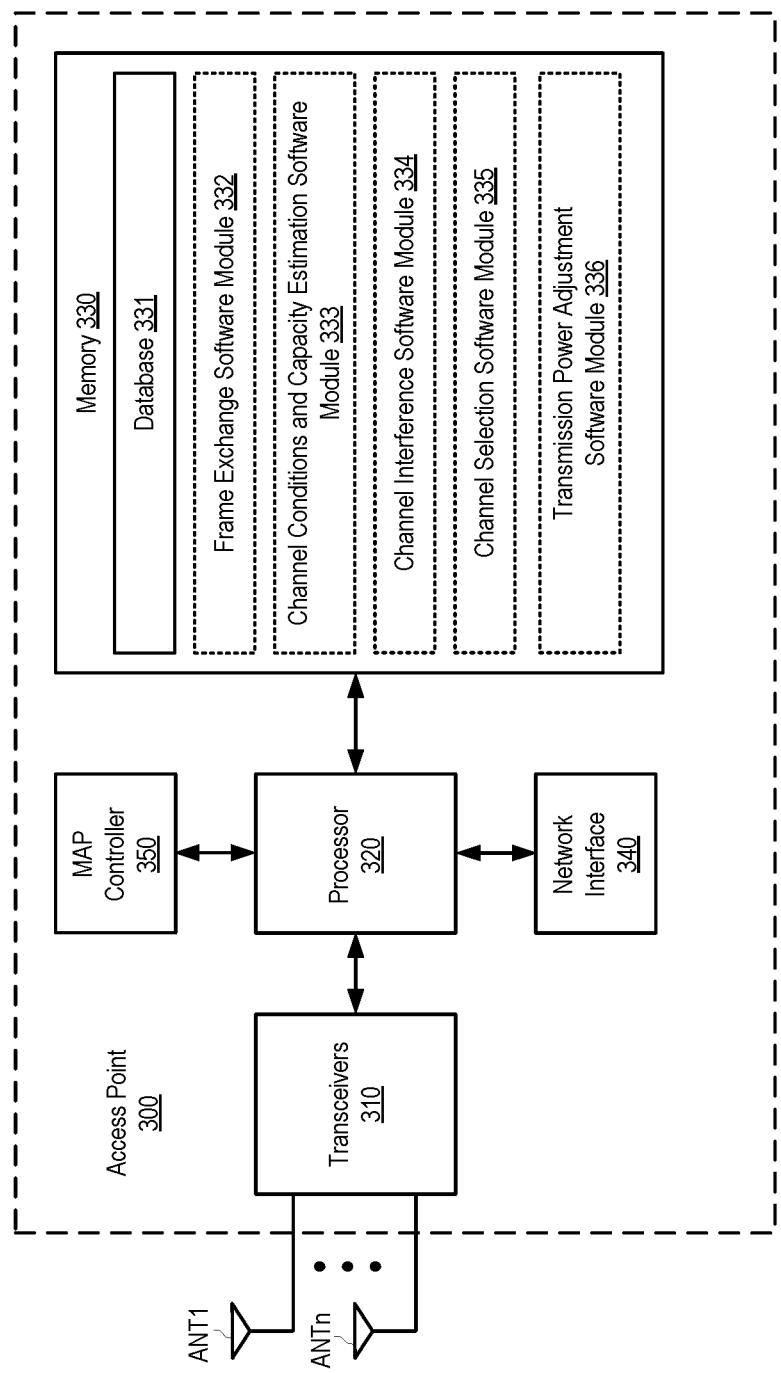
FIG. 3 shows a block diagram of an example AP.

FIG. 3 shows an example AP 300. The AP 300 may be an implementation of the root AP 110 of FIG. 1, may be an implementation of any of the APs 111-116 depicted in FIG. 1, or both. The AP 300 may include one or more transceivers 310, a processor 320, a memory 330, a network interface 340, a MAP Controller 350, and a number of antennas ANT1-ANTn. The transceivers 310 may be coupled to the antennas ANT1-ANTn, either directly or through an antenna selection circuit (not shown for simplicity). The transceivers 310 may be used to transmit signals to, and receive signals from, other wireless devices including, for example, one or more of the stations STA1-STA4 of FIG. 1, as well as other APs. Although not shown in FIG. 3 for simplicity, the transceivers 310 may include any number of transmit chains to process and transmit signals to other wireless devices via the antennas ANT1-ANTn, and may include any number of receive chains to process signals received from the antennas ANT1-ANTn. Thus, the AP 300 may be configured for MIMO communications and OFDMA communications. The MIMO communications may include SU-MIMO communications and MU-MIMO communications. In some implementations, the AP 300 may use multiple antennas ANT1-ANTn to provide antenna diversity. Antenna diversity may include polarization diversity, pattern diversity, and spatial diversity.

The network interface 340, which is coupled to the processor 320, may be used to communicate with the back-end network 120 depicted in FIG. 1. The network interface 340 also may allow the AP 300 to communicate, either directly or via one or more intervening networks, with other wireless systems, with other APs, with STAs, and so on.

The memory 330 may include a database 331 that may store location data, configuration information, data rates, MAC addresses, timing information, modulation and coding schemes, preferred channels, ranging capabilities, and other suitable information about (or pertaining to) a number of other wireless devices. The database 331 also may store profile information for a number of other wireless devices. The profile information for a given wireless device may include, for example, the wireless device's service set identification (SSID), BSSID, operating channels, TSF values, beacon intervals, ranging schedules, channel state information (CSI), received signal strength indicator (RSSI) values, goodput values, and connection history with the AP.

Figure 5:
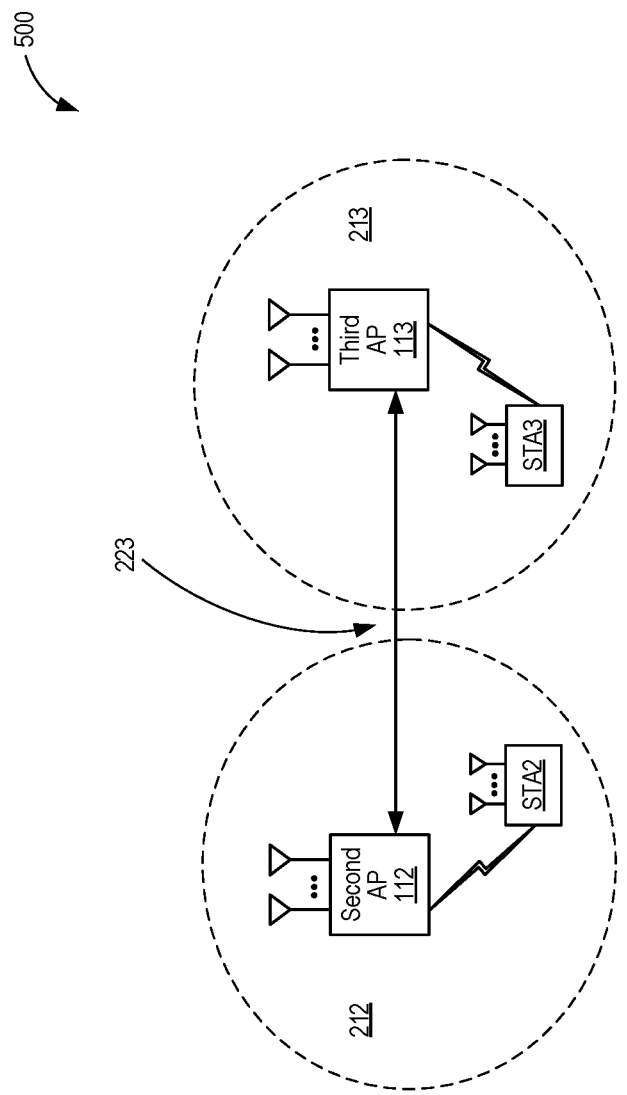
FIG. 5 shows example APs with non-overlapping wireless coverage areas.
Figure 6:
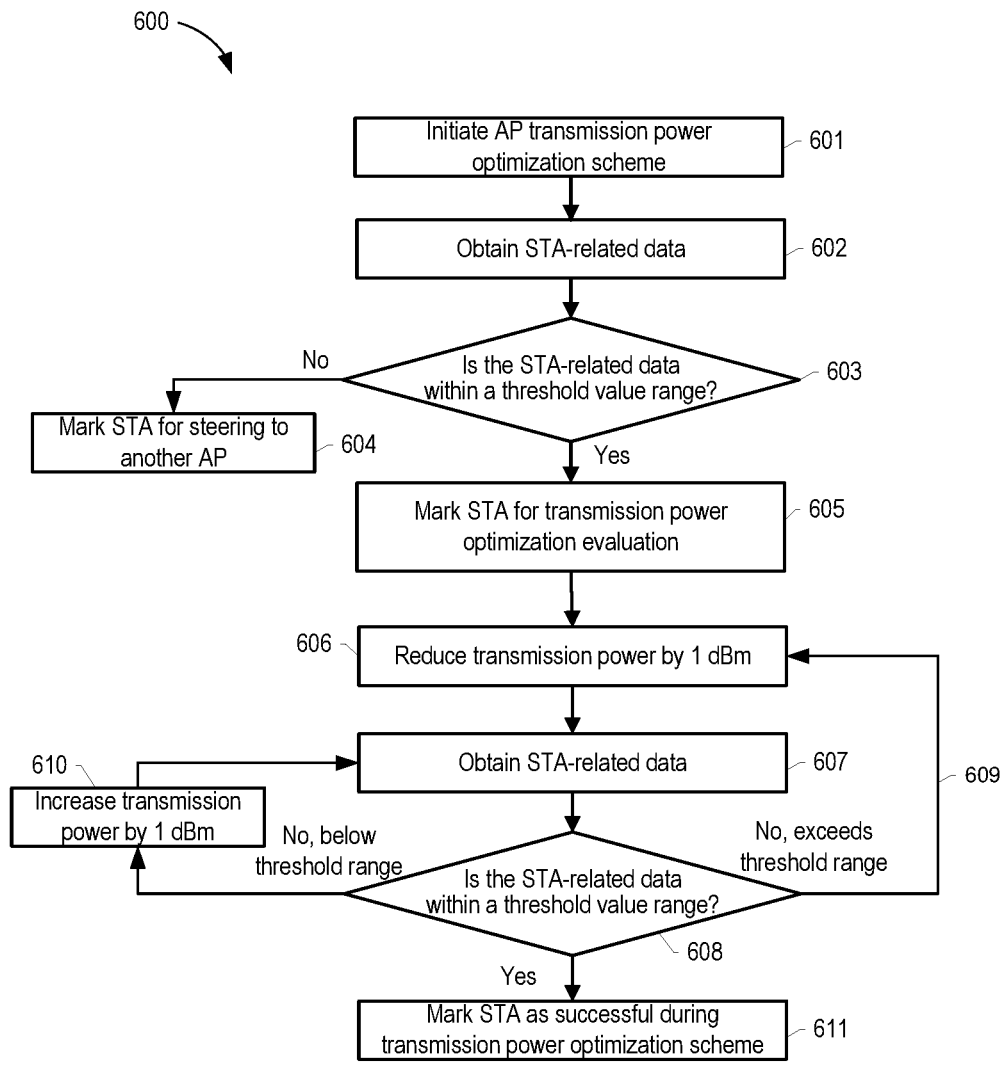
FIG. 6 shows an example process flow diagram for power transmission optimization.
Figure 7:
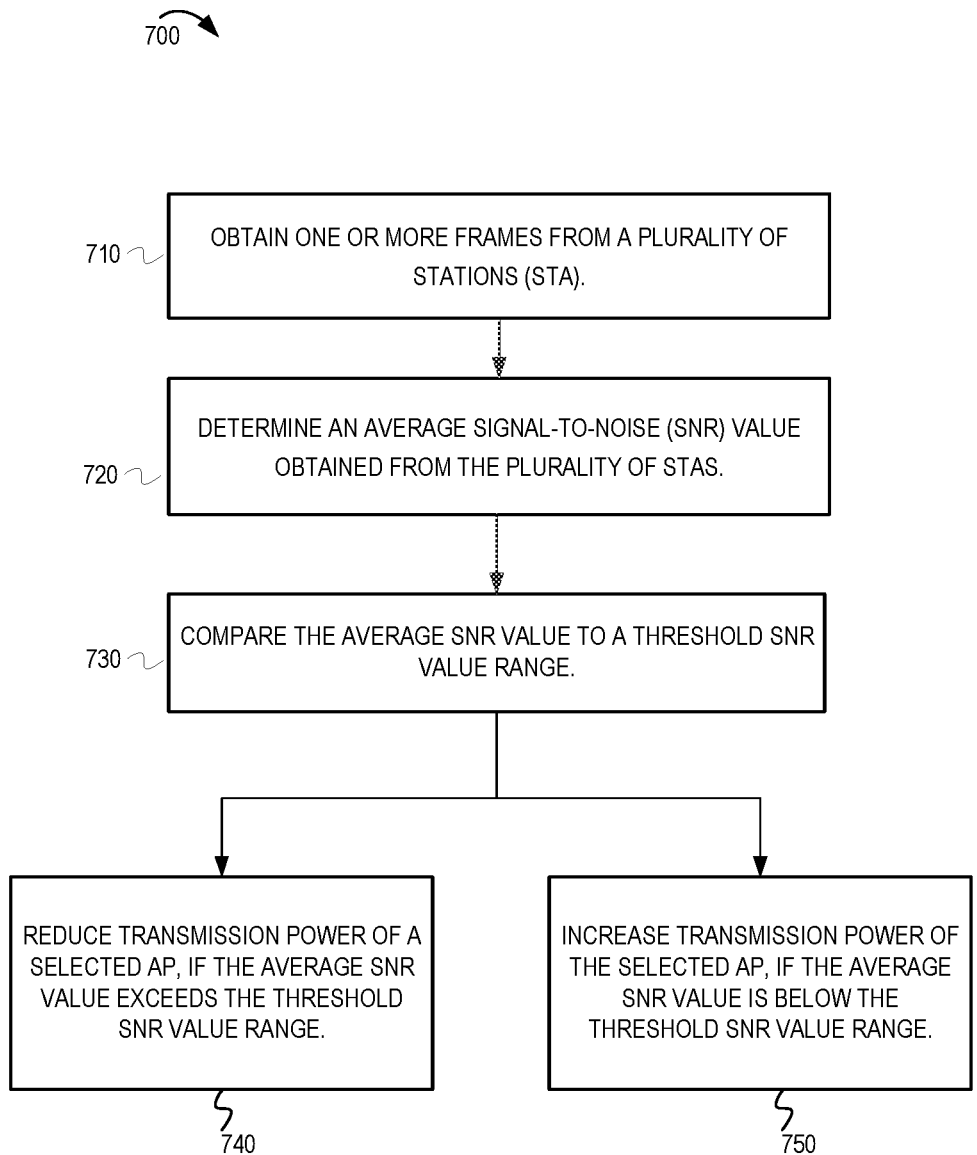
FIG. 7 shows an example method of adjusting transmission power for a selected AP.

The memory 330 also may include a non-transitory computer-readable storage medium (such as one or more non-volatile memory elements, such as EPROM, EEPROM, Flash memory, a hard drive, and so on) that may store the following software modules:

A frame exchange software module 332 to create and exchange a number of frames (such as data frames, control frames, acknowledgement frames, management frames, and action frames) between the AP 300 and other wireless devices, for example, as described with respect to at least FIGS. 5-7;

A channel conditions and capacity estimation software module 333 to estimate channel conditions and capacities of a number of wireless channels, to estimate available bandwidth and load information of a number of wireless devices, to estimate available airtime of wireless devices, or any combination thereof, for example, as described with respect to at least FIGS. 5-7;

A channel interference software module 334 to estimate co-channel interference within and between wireless coverage areas, for example, as described with respect to at least FIGS. 5-7;

A channel selection software module 335 to perform a number of channel selection operations to allocate operating channels to one or more APs within a network, for example, as described with respect to at least FIGS. 5-7; and A transmission power adjustment software module 336 to adjust transmission power for one or more APs in a network, for example, as described with respect to at least FIGS. 5-7.

Each software module includes instructions that, when executed by the processor 320, may cause the AP 300 to perform the corresponding functions. The non-transitory computer-readable medium of the memory 330 thus includes instructions for performing all or a portion of the operations described below with respect to at least FIGS. 5-7.

The processor 320 may be any one or more suitable processors capable of executing scripts or instructions of one or more software programs stored in the AP 300 (such as within the memory 330). The processor 320 may execute the frame exchange software module 332 to create and exchange a number of frames (such as data frames, control frames, acknowledgement frames, management frames, and action frames) between the AP 300 and other wireless devices.

The processor 320 may execute the channel conditions and capacity estimation software module 333 to estimate channel conditions and capacities of a number of wireless channels, to estimate available bandwidth and load information of a number of wireless devices, to estimate available airtime of wireless devices, or any combination thereof. The processor 320 may execute the channel interference software module 334 to estimate co-channel interference within or between adjacent wireless coverage areas. The processor 320 may execute the channel selection software module 335 to perform a number of channel selection operations to allocate operating channels to one or more APs within a network. The processor 320 may execute the transmission power adjustment software module 336 to adjust transmission power for one or more APs in a network.

The MAP Controller 350 may be coupled to the processor 320 and to the memory 330. In some implementations, the MAP Controller 350 may be one example of the MAP Controller 135 of FIG. 1. In addition, or in the alternative, the MAP Controller 350 may be implemented as a software program or module including instructions stored in the memory 330 for execution by the processor 320, and may be used to perform one or more of the operations described with respect to at least FIGS. 5-7.

Figure 4:
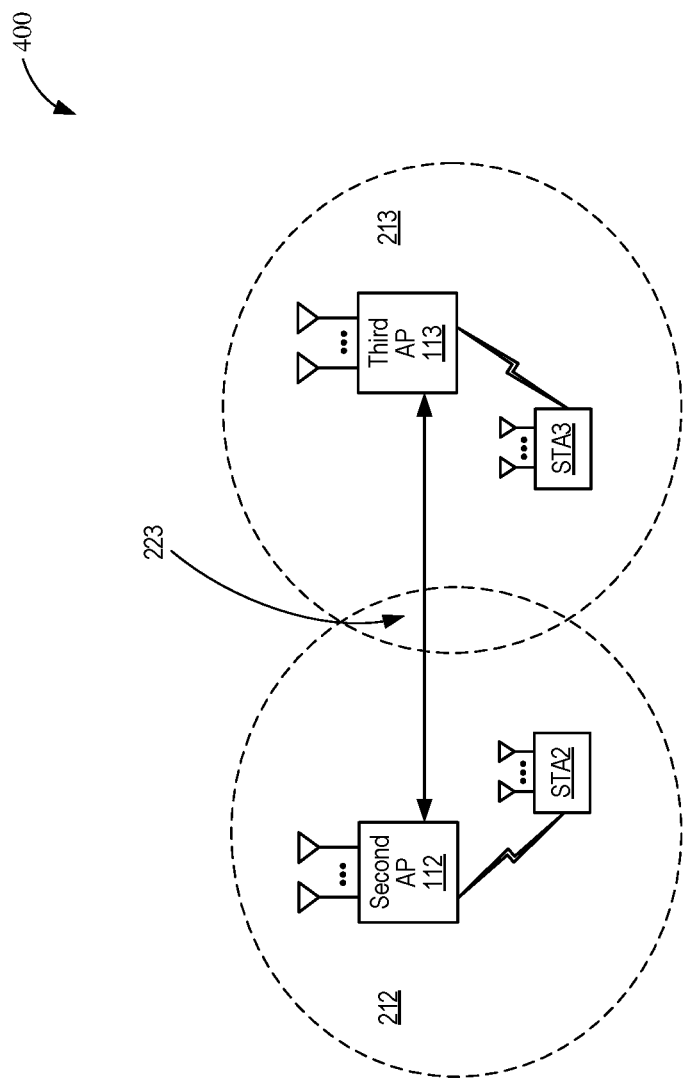
FIG. 4 shows example APs with overlapping wireless coverage areas.

FIG. 4 shows example APs with overlapping wireless coverage areas 400. The example APs include the second AP 112 and the third AP 113 depicted in FIGS. 1 and 2. In particular, FIG. 4 shows the second wireless coverage area 212 of the second AP 112 overlapping with the third wireless coverage area 213 of the third AP 113 at the third region 223. The station STA2 is located in the second wireless coverage area 212 and is connected to the second AP 112 over a wireless communication link. The station STA3 is located in the third wireless coverage area 213 and is connected to the third AP 113 over another wireless communication link.

The example depicted in FIG. 4 may be representative of a densely populated neighborhood, apartment complex or office space, where each house, apartment unit or office has an AP. In this example, neighboring units are forced to share the same channel due to a limited number of channels being available in the densely packed environment. Due to the built-in mechanism of CSMA/CA, neighboring APs cannot transmit simultaneously if an AP can sense a transmission on the shared wireless medium. As such, due to the overlapping wireless coverage areas of the second AP 112 and the third AP 113 at the region 223, if the second AP 112 is transmitting data over its wireless communication link to the station STA2, then the third AP 113 is prevented from transmitting data over its wireless communication link to the station STA3 on the same channel, and vice versa. As such, the station STA3 may not be served data from the third AP 113, or the serving of the data to the station STA3 may be significantly delayed. Thus, due to the overlapping wireless coverage areas, and the inherent limitations for transmitting data on the same channel, latency in data transmission may be increased and, as a corollary, user experience may be adversely impacted. This deficiency has recently been exacerbated, as some market participants in the wireless industry have commenced using high power amplifiers to increase the transmission power and further maximize the wireless coverage areas of an AP. Unfortunately, increasing the transmission power and maximizing the wireless coverage area may result in further interference within and across BSSs, and may significantly impact user experience at the respective STAs.

FIG. 5 shows example APs with non-overlapping wireless coverage areas 500. The example APs include the second AP 112 and the third AP 113 depicted in FIGS. 1, 2 and 4. In particular, FIG. 5 shows the second wireless coverage area 212 of the second AP 112 not overlapping with the third wireless coverage area 213 of the third AP 113 at the region 223. The station STA2 is located in the second wireless coverage area 212 and is connected to the second AP 112 over a wireless communication link. The station STA3 is located in the third wireless coverage area 213 and is connected to the third AP 113 over another wireless communication link.

In the example depicted in FIG. 5, the second AP 112 and the third AP 113 have reduced their respective data transmission power, and as such, the second wireless coverage area 212 no longer overlaps with the third wireless coverage area 213. In other words, instead of utilizing high power amplification to maximize the respective wireless coverage areas, the second AP 112 and the third AP 113 have adopted a more lenient approach to data transmission within their BSSs, which can mitigate interference to neighboring APs. The second AP 112 and the third AP 113 can be implemented to compute the optimum transmission power required for STAs residing within the respective BSS, and to adjust the transmission power for those STAs in the BSS so that co-channel interference is minimized.

In some implementations, to compute the transmission power required for STAs within the BSS, the AP can obtain frames from each of the STAs within the BSS. The frames can, for example, be acknowledgement (ACK) packets, and can include, amongst other data and values, signal-to-noise ratio (SNR) values. Since SNR values may change over time, depending on the data transmission rate, the AP can be implemented to determine an average SNR value of the frames obtained from the STAs. The AP can be implemented to ascertain that, for a given STA, fluctuations in the SNR value are minimal, or within a prescribed or predetermined range, i.e., a threshold SNR value range. Once the AP has ascertained that the STA's average SNR value is within the threshold SNR value range, the AP can compute, calculate or process an appropriate transmission power for the given STA. In some implementations, such as when the average SNR value exceeds the threshold SNR value range, the AP can be configured to reduce the transmission power in the wireless coverage area. In some other implementations, such as when the average SNR value is below the threshold SNR value range, the AP can be configured to increase the transmission power in the wireless coverage area.

After the AP has iterated this process over all the STAs within the BSS, the AP can ascertain the optimum transmission power required to adequately serve data to each STA in the wireless coverage area. The AP can utilize the optimum transmission power to deliver wireless signals to the STAs within the BSS, while mitigating interference with other APs or STAs operating in neighboring wireless coverage areas.

By employing transmission power adjustment schemes, the second AP 112 effectively reduced its transmission power to adequately serve the station STA2, and the third AP 113 effectively reduced its transmission power to adequately serve the station STA3, while preventing the creation of overlapping wireless coverage areas at region 223. In other words, by reducing transmission power, such as in an iterative transmission power reduction scheme, not only can interference be mitigated, but also collision and backoff-related issues may be mitigated, without adversely impacting the traffic demand of the STAs in the serving BSS. Therefore, the transmission power adjustment scheme enables both the second AP 112 and the third AP 113 to transmit data at substantially the same time on the same channel to their respective STAs, the station STA2 and the station STA3.

In some implementations, like where the AP is operating in a multi-AP environment, a root AP, such as the root AP 110 depicted in FIGS. 1 and 2, serving as a MAP Controller, can be implemented to reduce/increase the transmission power of the AP, or to instruct the AP to reduce/increase the transmission power within the wireless coverage area. Utilizing the described transmission power adjustment schemes enables the root AP, or the MAP Controller, to control the transmission power of all APs operating within the multi-AP environment to create wireless coverage areas having the least amount of interference.

In some implementations, like where the multi-AP environment is part of a SON environment, one or more of the APs, such as the second AP 112 and the third AP 113, can communicate with one another to employ the transmission power adjustment scheme. A SON Controller, residing at a root AP, or in one of the second AP 112 or the third AP 113, can be implemented to reduce/increase the transmission power of a selected AP, or to instruct the selected AP to reduce/increase the transmission power within the respective wireless coverage area.

FIG. 6 shows an example process flow diagram 600 for power transmission optimization. The operations of the process flow diagram 600 may be implemented by the root AP 110, depicted and described in FIGS. 1-5, or its components described throughout. The operations of the process flow diagram 600 also may be implemented by one or more of the APs 111-116, depicted and described in FIGS. 1-5, or their components as described throughout.

In some implementations, the root AP 110 or the APs 111-116, may execute a set of codes to control the functional elements of the respective device, or of one or more other devices, to perform the functions described in FIG. 6. Additionally, or alternatively, the root AP 110 or the APs 111-116, may perform aspects of the functions described in FIG. 6 using special-purpose hardware.

At block 601, an AP transmission power optimization scheme may be initiated. The root AP 110 or one or more of the APs 111-116 may initiate the transmission power optimization scheme after determining that interference is present in overlapping wireless coverage areas between two neighboring APs. Alternatively, the transmission power optimization scheme may be initiated after determining that interference is present in overlapping BSSs (OBSS) between two neighboring APs.

At block 602, data related to one or more STAs may be obtained. The data may be obtained by the root AP 110 or one or more of the APs 111-116. For example, the data may be obtained by the frame exchange software module 332, or the channel interference software module 334, depicted and described in FIG. 3. The data may be obtained from any of the stations STA1-STA4 depicted in FIGS. 1,2,4 and 5 connected to the selected AP. The data can be obtained from one or more frames associated with, or related to, the STAs. For example, the data can be obtained from ACK packets, and can include SNR values, transmission byte counts, receiving byte counts, modulation and coding scheme (MCS) values, packet error rate (PER) values, spatial stream values, data rate values, received signal strength indicator (RSSI) values, etc.

At determination block 603, an AP may determine whether the STA-related data is within a threshold value range. In some implementations, a processor of the AP, such as the processor 320 depicted and described in FIG. 3, may determine whether the STA-related data is within a threshold value range. In other words, the processor can compare the data obtained from one or more frames to a threshold value range. The threshold value ranges may be predetermined, configurable, or dynamically adjusted, depending on the particular implementation.

For example, the processor can compare the SNR values received from a STA to a threshold SNR value range. The threshold SNR value ranges may be, for example: [>40 dBm] which may indicate that the signal is well received by the STA; [25 dBm to 40 dBm] which may indicate that the signal is very good, but if the signal begins to deteriorate, or too many client STAs are being served, or the served goodput becomes insufficient (i.e., a particular defined percentage below or above the threshold value range), the STA may be marked for steering to another AP; [15 dBm to 25 dBm] which indicates that a change in transmission power is necessary for the STA to adequately receive the signal; and [10 dBm to 15 dBm] which may indicate that the signal is poor and not well received by the particular STA, etc.

In another example, the processor can compare RSSI values received from a STA to a threshold RSSI value range. The threshold RSSI value range may be, for example: [−75 dBm to −85 dBm] which may indicate that the signal strength is poor, and the client STA may be better off steered to another AP; [−65 dBm to −75 dBm] which may indicate that the signal strength is moderate, but the client STA goodput may occasionally become insufficient, so a change in transmission power may be necessary; [−55 dBm to −65 dBm] which may indicate that the signal strength is good and the client STA is being well-served by the serving AP; and [−45 dBm to −55 dBm] which may indicate that the signal strength is strong, and the client STA is receiving a strong signal, etc.

Additionally, the processor can compare the transmission byte counts, receiving byte counts, MCS values, PER values, spatial stream values, and data rate values to threshold transmission byte counts values, threshold receiving byte counts values, threshold MCS values, threshold PER values, threshold spatial stream values, and threshold data rate values, respectively.

In response to determining that the STA-related data is not within a threshold value range (i.e., determination block 603="No"), the processor can mark the STA for steering to another AP at block 604. In other words, if the STA's data falls outside (such as exceeds, or is below) the particular threshold value range, the AP can steer the STA to a neighboring AP, and particularly one where the STA's data may fall within that neighboring AP's threshold value range. In multi-AP environment implementations, the AP can send a steering-related message to another AP, and also can send a steering request to the STA, where the steering request instructs the STA to join a BSS of the another AP.

In some SON implementations, client STAs can be steered from one AP to another AP whenever the client STA's-related data performance is deficient, such as exceeding or falling below a threshold value range. In such instances, the first AP can send a steering request to the client STA, and through a proprietary SON protocol, can inform the second AP that is should expect the client STA to join the second AP's BSS, and the reason for why the client STA is being steered (i.e., high SNR values, low RSSI values, high PER values, etc.)

In response to determining that the STA-related data is within a threshold value range (i.e., determination block 603="Yes"), the processor can mark the STA for a transmission power optimization evaluation at block 605. Here, the AP can be implemented to iteratively determine an appropriate, or optimum, transmission power for the marked STA.

At block 606, the AP can reduce the transmission power by 1 decibel per milliwatt (dBm). The root AP 110, or any of the APs 111-116, can be implemented to reduce the transmission power of the selected AP by 1 dBm. In some implementations, the transmission power adjustment software module 336 depicted and described in FIG. 3, can be implemented to reduce the transmission power of the selected AP by 1 dBm. In some implementations, the transmission power can be adjusted upward, in 1 dBm increments. In some other implementations, the transmission power can be reduced or increased in greater than 1 dBm increments, such as 2 dBm increments, 3 dBm increments, 5 dBm increments, etc.

At block 607, data related to one or more STAs may again be obtained. This time, the data is obtained after the AP has decremented its transmission power by 1 dBm. The data may be obtained by the root AP 110 or one or more of the APs 111-116. For example, the data may be obtained by the frame exchange software module 332, or the channel interference software module 334, depicted and described in FIG. 3. The data may be obtained from the STA connected to the selected AP. Again, the data can be obtained from one or more frames associated with, or related to, the STAs. For example, the data can be obtained from ACK packets, and can include SNR values, transmission byte counts, receiving byte counts, MCS values, PER values, spatial stream values, data rate values, RSSI values, etc.

At determination block 608, the AP may determine whether the STA-related data is within a threshold value range. This determination occurs after the AP has decremented its transmission power by 1 dBm. In some implementations, a processor of the AP, such as the processor 320 depicted and described in FIG. 3, may determine whether the STA-related data is within a threshold value range. Again, the processor can compare the data obtained from one or more frames to a threshold value range. The threshold value ranges may be predetermined, configurable, or dynamically adjusted, depending on the particular implementation. Additionally, the threshold value ranges can be different than the threshold value ranges described with respect to determination block 603 (i.e., the threshold value ranges may be more stringent, or more lenient, depending on the particular implementation). As described above, the processor can be implemented to compare the SNR values received from the STA to a threshold SNR value range, or the RSSI values received from the STA to a threshold RSSI value range. Additionally, the processor can compare the transmission byte counts, receiving byte counts, MCS values, PER values, spatial stream values, and data rate values to threshold transmission byte counts values, threshold receiving byte counts values, threshold MCS values, threshold PER values, threshold spatial stream values, and threshold data rate values, respectively.

In response to determining that the STA-related data is not within a threshold value range, and is below the threshold value range (i.e., determination block 608="No, below threshold range"), the AP can be implemented to increase the transmission power by 1 dBm at block 610. In this situation, due to the AP's reduction in transmission power by 1 dBm at block 606, the STA's goodput is no longer acceptable, and one or more of the STA's SNR values, transmission/receiving byte counts, MCS values, PER values, spatial stream values, data rate values, RSSI values, etc., has been adversely impacted by the reduced transmission power. As such, at block 610, the AP can be implemented to increase its transmission power by 1 dBm, before again obtaining data related to the STA at block 607.

In response to determining that the STA-related data is not within a threshold value range, and is above the threshold value range (i.e., determination block 608="No, exceeds threshold range"), the AP can be implemented to further reduce the transmission power by another 1 dBm via line 609. In this situation, the STA's obtained values indicate that the AP can likely further reduce transmission power by another 1 dBm at block 606, as the STA's goodput is more than acceptable at the current transmission power level. As such, at block 606, the AP can reduce the transmission power by another 1 dBm, before again obtaining data related to the STA at block 607.

In either situation, when the determination block 608=No, a portion of the process flow diagram 600 can be performed iteratively. In other words, the transmission power can be iteratively reduced by 1 dBm, or iteratively increased by 1 dBm, until the obtained STA-related data is within the threshold value range.

In response to determining that the STA-related data is within a threshold value range (i.e., determination block 608="Yes"), the processor can mark the STA as successful during the transmission power optimization scheme at block 611. In other words, the AP managed, via one or more iterations, to optimize the transmission power used to wirelessly communicate with the STA, and the STA-related data under evaluation is within the particular threshold value range.

The process flow diagram 600 can be repeated for a plurality, or all, stations in the AP's BSS. In other words, STA-related data can be obtained from multiple STAs within the BSS. And instead of determining whether a particular STA's data is within a threshold value range, a processor at the AP can determine an average of the data obtained from the multiple STAs. For example, the processor can determine an average SNR value obtained from the multiple STAs. The processor also can compare the average of the data obtained from multiple APs to a threshold value range. For example, the processor can compare the average SNR value obtained from the multiple STAs to a threshold SNR value range. Again, the threshold value ranges may be predetermined, configurable, or dynamically adjusted, depending on the particular implementation. And in addition to SNR values, the processor can compare the average transmission byte counts, average receiving byte counts, average MCS values, average PER values, average spatial stream values, average data rate values, average RSSI values to threshold transmission byte counts values, threshold receiving byte counts values, threshold MCS values, threshold PER values, threshold spatial stream values, threshold data rate values, and threshold RSSI values. If the average STA-related values exceed the threshold value range, the AP can be implemented to reduce its transmission power. Conversely, if the average STA-related values are below the threshold value range, the AP can be implemented to increase its transmission power.

Additionally, the process flow diagram 600 can be repeated for multiple APs within a multi-AP environment, such that each AP's transmission power is optimized for the STAs residing in the particular APs wireless coverage area. By following the process flow diagram 600, APs in the multi-AP environment can deliver effective wireless signals to the STAs within the BSS, while reducing interference with other APs or STAs operating in neighboring wireless coverage areas.

In some SON implementations, the transmission power adjustment scheme can be implemented on a per STA basis for the purpose of interference management. In other words, in transmit beamforming mode, the AP may employ transmission power control for a particular STA that is experiencing interference, but may not need to reduce the transmission power to other STAs that did not report high PER values, low RSSI values, or high SNR values in the multi-AP environment.

FIG. 7 shows an example method 700 of adjusting transmission power for a selected AP. The selected AP may reside in a multi-AP environment. In some implementations, the multi-AP environment is part of a self-organizing network (SON). The operations of the method 700 may be implemented by the root AP 110, depicted and described in FIGS. 1-5, or its components described throughout. The operations of the method 700 also may be implemented by one or more of the APs 111-116, depicted and described in FIGS. 1-5, or their components as described throughout. In some implementations, the root AP 110 or the APs 111-116, may execute a set of codes to control the functional elements of the respective device, or of one or more other devices, to perform the functions described in FIG. 7 Additionally, or alternatively, the root AP 110 or the APs 111-116, may perform aspects of the functions described in FIG. 7 using special-purpose hardware.

At block 710, one or more frames may be obtained from a plurality of stations. The one or more frames may be obtained by the root AP 110 or one or more of the APs 111-116. The plurality of stations may include one or more of the stations STA1-STA4, depicted and described with respect to FIGS. 1,2,4 and 5. The frames can include STA-related data values, such as SNR values. In some implementations, the frames can be obtained via a first interface coupled to the root AP 110 or one or more of the APs 111-116. In some other implementations, the frames can be received via an antenna, or transceiver coupled to the root AP 110 or one or more of the APs 111-116.

At block 720, an average SNR value, obtained from the plurality of STAs, can be determined. The average SNR value can be determined by a processor operating at the root AP 110, or a processor(s) operating at one or more of the APs 111-116. The term "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

At block 730, the average SNR value can be compared to a threshold SNR value range. The average SNR value can be compared to the threshold SNR value range by the processor operating at the root AP 110, or the processor(s) operating at one or more of the APs 111-116. In some implementations, a Multi-AP Controller, or SON Controller, compares the average SNR value to the threshold SNR value. In some implementations, the threshold SNR value range can be determined based on an MCS index table. In some implementations, the MCS index table includes one or more modulations values, coding values, spatial stream values, data rate values, and RSSI values.

At block 740, if the average SNR value exceeds the threshold SNR value range, the transmission power of the selected AP can be reduced. The transmission power of the selected AP can be reduced by the AP itself, or by a root AP (such as root AP 110) serving as a Multi-AP Controller, or SON Controller, in a multi-AP environment. Reducing the transmission power can occur iteratively until the average SNR value resides in the threshold SNR value range. The transmission power can be iteratively reduced by, for example, 1 dBm, 2 dBm, 3 dBm, etc.

In some implementations, when the average SNR value exceeds the threshold SNR value, a modulation value different than a current modulation value utilized by the selected AP can be selected. In some other implementations, when the average SNR value exceeds the threshold SNR value, a coding value different than a current coding value utilized by the selected AP can be selected. In some implementations, when the average SNR value exceeds the threshold SNR value, both a modulation value different than a current modulation value utilized by the selected AP, and a coding value different than a current coding value utilized by the selected AP can be selected. In any of these implementations, the processor residing in the AP or the root AP can initiate the selections.

At block 750, if the average SNR value is below the threshold SNR value range, the transmission power of the selected AP can be increased. The transmission power of the selected AP can be increased by the AP itself, or by a root AP (such as root AP 110) serving as a Multi-AP Controller, or SON Controller, in a multi-AP environment. Increasing the transmission power can occur iteratively until the average SNR value resides in the threshold SNR value range. The transmission power can be iteratively increased by, for example, 1 dBm, 2 dBm, 3 dBm, etc.

In some implementations, when the SNR value for a STA in the plurality of STAs is a defined percentage, such as 5%, or 10%, or 15%, or 20%, or 25%, or more, above or below the average SNR value obtained from the plurality of STAs, the STA can be marked for steering to another AP in the multi-AP environment. For example, the selected AP can be implemented to send a message to a second AP. The message can indicate that the selected AP is reducing its transmission power to its BSS, and the SNR value for the STA is above or below the defined percentage, i.e., 5%, or 10%, or 15%, or 20%, or 25%, of the average SNR value obtained from the plurality of STAs within its BSS. The selected AP also can be implemented to send a steering request to the STA, where the steering request instructs the STA to join a BSS of the second AP. The selected AP also can be implemented to inform the second AP that the steering request instructs the STA to join the BSS of the second AP. Alternatively, the root AP, serving as a Multi-AP Controller, or SON Controller, can be implemented to send these steering-related messages to the STA and the second AP.

In some implementations, if the selected AP cannot effectively steer the STA to another AP, the selected AP may terminate or place the transmission power adjustment scheme on hold. In other words, the transmission power adjustment scheme may be triggered only when throughput, goodput, RSSI, PER and MCS threshold values can be served to the greatest number of STAs. Thus, the transmission power adjustment scheme may be paused when the data from one or more STAs is outside the threshold value ranges of the various criteria, and the STA cannot effectively be steered to a more capable serving AP.

While the example method 700 in FIG. 7 includes five discrete blocks, a person having ordinary skill in the art will readily recognize that other blocks can be inserted between the depicted blocks. Additionally, other blocks may be performed before or after certain depicted blocks.

Figure 8:
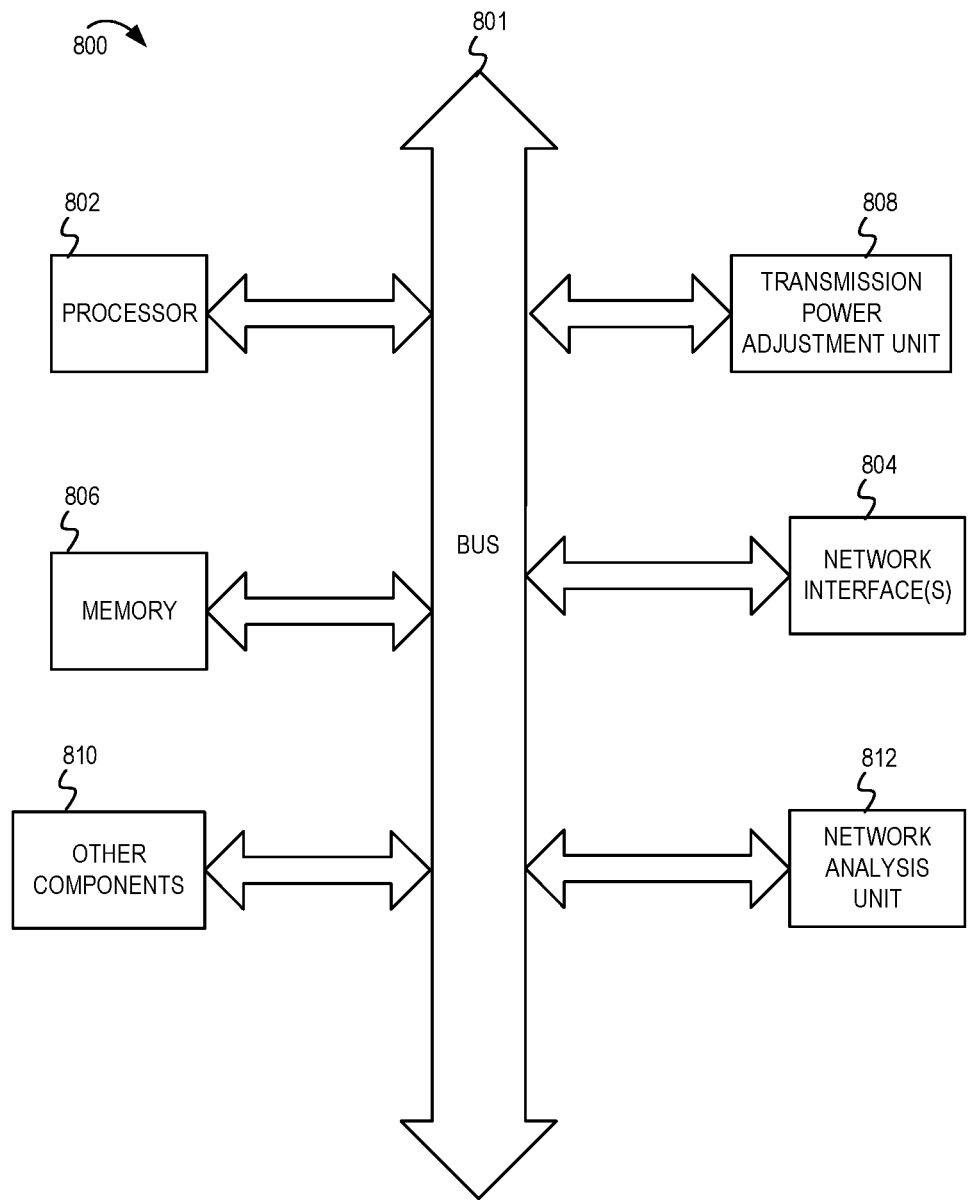
FIG. 8 shows a block diagram of an example electronic device.

FIG. 8 shows a block diagram of an example electronic device 800. In some implementations, the electronic device 800 may be a root AP (such as the root AP 110) serving as a Multi-AP Controller or a SON Controller, or one or more APs (such as any of the APs 111-116). The electronic device 800 includes a processor 802 (possibly including multiple processors, multiple cores, multiple nodes, or implementing multi-threading, etc.). The processor 802 may be a component of a processing system.

A processing system may generally refer to a system or series of machines or components that receives inputs and processes the inputs to produce a set of outputs (which may be passed to other systems or components of, for example, the electronic device 800). For example, a processing system of the electronic device 800 may refer to a system including the various other components 810 or subcomponents of the electronic device 800.

The processing system of the electronic device 800 may interface with other components of the electronic device 800, and may process information received from other components (such as inputs or signals), output information to other components, etc. For example, a chip or modem of the electronic device 800 may include a processing system, a first interface to output information, and a second interface to receive information. In some cases, the first interface may refer to an interface between the processing system of the chip or modem and a transmitter, such that the electronic device 800 may transmit information output from the chip or modem. In some cases, the second interface may refer to an interface between the processing system of the chip or modem and a receiver, such that the electronic device 800 may receive information or signal inputs, and the information may be passed to the processing system.

The electronic device 800 includes a memory 806. The memory 806 may be system memory or any one or more of the below described possible realizations of machine-readable media. The memory 806 includes functionality to support various implementations described herein. The memory 806 may include one or more functionalities that facilitate a processor of an access point for adjusting transmission power in a multi-AP environment. For example, the memory 806 can include functionalities that facilitate or implement one or more aspects of the root AP 110 or the APs 111-116 described herein.

Any one of these functionalities may be partially (or entirely) implemented in hardware, such as on the processor 802. For example, the functionality may be implemented with an application specific integrated circuit, in logic implemented in the processor 802, in a co-processor on a peripheral device or card, etc. Further, realizations may include fewer or additional components not illustrated in FIG. 8 (such as video cards, audio cards, additional network interfaces, peripheral devices, etc.).

The electronic device 800 also may include a bus 801 (such as PCI, ISA, PCI-Express, HyperTransport®, Infini-Band®, NuBus, AHB, AXI, etc.). The processor 802, and the memory 806, may be coupled to the bus 801. Although illustrated as being coupled to the bus 801, the memory 806 may be directly coupled to the processor 802.

The electronic device may include one or more network interfaces 804, which may be a wireless network interface (such as a WLAN interface, a Bluetooth® interface, a WiMAX interface, a ZigBee® interface, a Wireless USB interface, or another network interface associated with the wireless networking technologies described herein) or a wired network interface (such as a powerline communication interface, an Ethernet interface, etc.). In some implementations, the electronic device 800 may support multiple network interfaces 804, each of which may be configured to couple the electronic device 800 to a different communication network.

The electronic device 800 also may include a transmission power adjustment unit 808. The transmission power adjustment unit 808 can be controlled to increase or decrease the transmission power of the electronic device. The transmission power adjustments can be made in 1 dBm increments, or other suitable dBm increments, depending on the designed implementation. The electronic device 800 also may include a network analysis unit 812. The network analysis unit 812 can be implemented to analyze the wireless network and determine if interference exists in one or more overlapping wireless coverage areas. The electronic device 800 may include means for performing one or more operations described herein, such as the process flow diagram 600 and the method 700 depicted and described in FIGS. 6 and 7, respectively. In some aspects, such means may include one or more components of the electronic device 800 described in connection with the APs 110-116 or the stations STA1-STA4 depicted and described in FIGS. 1-5.

Figure 9:
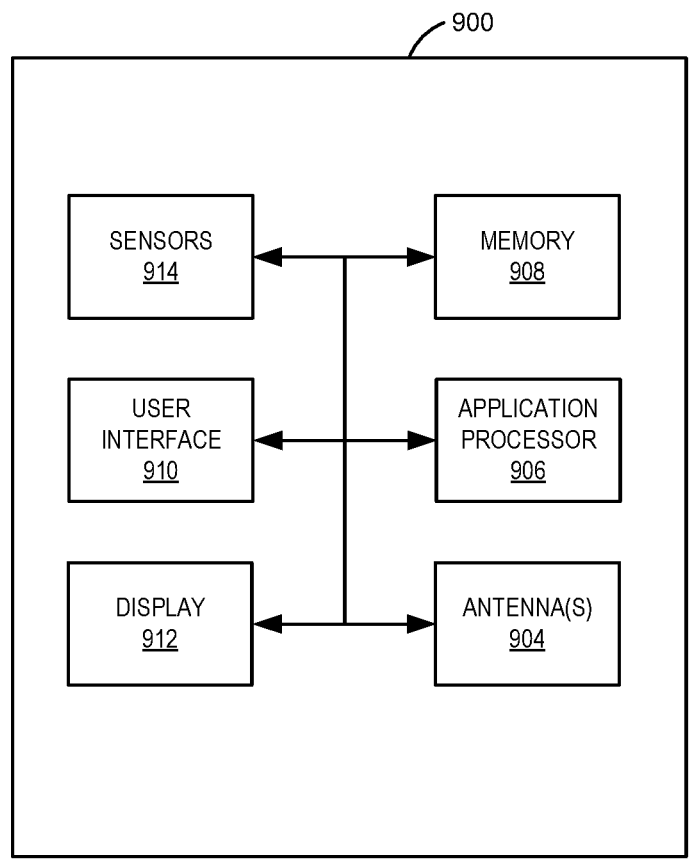
FIG. 9 shows another block diagram of an example electronic device.

FIG. 9 shows another block diagram of an example electronic device 900. The electronic device 900 can be an example implementation of one or more of the stations STA1-STA4 described with reference to FIG. 1. The electronic device 900 can be implemented as a wireless communication device. The electronic device 900 also includes one or more antennas 904 coupled with the wireless communication device 902 to transmit and receive wireless communications. The electronic device 900 additionally includes an application processor 906, and a memory 908 coupled with the application processor 906. In some implementations, the electronic device 900 further includes a user interface (UI) 910 (such as a touchscreen or keypad) and a display 912, which may be integrated with the UI 910 to form a touchscreen display. In some implementations, the electronic device 900 may further include one or more sensors 914 such as, for example, one or more inertial sensors, accelerometers, temperature sensors, pressure sensors, or altitude sensors. One or more of the aforementioned components can communicate with other components directly or indirectly, such as over one or more bus interfaces, or wireless network interfaces.

The electronic device 900 may include means for performing one or more operations described herein, such as the process flow diagram 600 and the method 700 depicted and described in FIGS. 6 and 7, respectively. In some aspects, such means may include one or more components of the electronic device 900 described in connection with the APs 110-116 or the stations STA1-STA4 depicted and described in FIGS. 1-5.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends on the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of adjusting transmission power for a selected access point (AP) in a multi-AP environment, comprising:
    obtaining one or more frames from a plurality of stations (STAs) within the multi-AP environment;
    determining an average SNR value based on the one or more frames obtained from the plurality of STAs; and
    comparing the average SNR value to a threshold SNR value range;
    if the average SNR value exceeds the threshold SNR value range, reducing transmission power of the selected AP within the multi-AP environment;
    if the average SNR value is below the threshold SNR value range, increasing transmission power of the selected AP within the multi-AP environment.

2. The method of claim 1, wherein the reducing transmission power occurs iteratively until the average SNR value resides in the threshold SNR value range.

3. The method of claim 2, wherein the transmission power is iteratively reduced by 1 decibel per milliwatt (dBm).

4. The method of claim 1, wherein the increasing transmission power occurs iteratively until the average SNR value resides in the threshold SNR value range.

5. The method of claim 4, wherein the transmission power is iteratively increased by 1 dBm.

6. The method of claim 1, wherein the threshold SNR value range is determined based on a modulation and coding scheme (MCS) index table.

7. The method of claim 6, wherein the MCS index table includes one or more, or any combination thereof, of the following values:
    modulation values, coding values, spatial stream values, data rate values, and received signal strength indicator (RSSI) values.

8. The method of claim 7, wherein if the average SNR value exceeds the threshold SNR value range, further comprising:
    selecting a different modulation value than a current modulation value utilized by the selected AP; or
    selecting a different coding value than a current coding value utilized by the selected AP.

9. The method of claim 1, wherein the multi-AP environment is part of a self-organizing network (SON).

10. The method of claim 9, wherein a SON Controller compares the average SNR value to the threshold SNR value.

11. The method of claim 10, wherein when the average SNR value exceeds the threshold SNR value range, the SON Controller reduces the transmission power of the selected AP within the multi-AP environment.

12. The method of claim 10, wherein when the average SNR value falls below the threshold SNR value range, the SON Controller increases the transmission power of the selected AP within the multi-AP environment.

13. The method of claim 1, wherein when the SNR value for a STA in the plurality of STAs is a defined percentage below the average SNR value obtained from the plurality of STAs, further comprising:
    sending a message from the selected AP to a second AP in the multi-AP environment; and
    sending a steering request to the STA, wherein the steering request instructs the STA to join a Basic Service Set (BSS) of the second AP.

14. The method of claim 13, wherein the message indicates that the selected AP is reducing the transmission power to its BSS, and the SNR value for the STA is more than the defined percentage below the average SNR value obtained from the plurality of STAs within its BSS.

15. The method of claim 13, wherein the message informs the second AP that the steering request instructs the STA to join the BSS of the second AP.

16. An access point (AP) for performing a transmission power adjustment operation in a multi-AP environment, comprising:

a first interface configured to obtain one or more frames from a plurality of stations (STAs) within the multi-AP environment; and a processing system configured to:
  determine an average SNR value based on the one or more frames obtained from the plurality of STAs;
  compare the average SNR value to a threshold SNR value range; and
  reduce the transmission power if the average SNR value exceeds the threshold SNR value range; or
  increase the transmission power if the average SNR value is below the threshold value range.

17. The AP of claim 16, wherein:
the reducing the transmission power or the increasing the transmission power occurs iteratively until the average SNR value resides in the threshold SNR value range.

18. The AP of claim 16, wherein the threshold SNR value range is determined based on a modulation and coding scheme (MCS) index table.

19. The AP of claim 18, wherein the MCS index table includes one or more, or any combination thereof, of the following values:
  modulation values, coding values, spatial stream values, data rate values, and received signal strength indicator (RSSI) values.

20. The AP of claim 19, wherein if the average SNR value exceeds the threshold SNR value range, the processing system is further configured to:
  select a different modulation value than a current modulation value employed by the AP; or
  select a different coding value than a current coding value employed by the AP.

21. The AP of claim 16, wherein when the SNR value for a STA in the plurality of STAs is a defined percentage above or below the average SNR value obtained from the plurality of STAs, the processing system is further configured to:
  send a message to a second AP in the multi-AP environment; and
  send a steering request to the STA, wherein the steering request instructs the STA to join a Basic Service Set (BSS) of the second AP.

22. A non-transitory computer-readable medium comprising processor-executable program code configured to cause a processor of an access point (AP), operating within a multi-AP environment, to:
  obtain one or more frames from a plurality of stations (STAs);
  determine an average SNR value based on the one or more frames obtained from the plurality of STAs; and
  compare the average SNR value to a threshold SNR value range;
    if the average SNR value exceeds the threshold SNR value range, reduce a transmission power to one or more of the plurality of STAs;
    if the average SNR value is below the threshold SNR value range, increase the transmission power to one or more of the plurality of STAs.

23. The non-transitory computer-readable medium of claim 22, wherein the reducing the transmission power or the increasing the transmission power occurs iteratively by 1 decibel per milliwatt (dBm).

24. The non-transitory computer-readable medium of claim 22, wherein when the SNR value for a STA in the plurality of STAs is a defined percentage below or above the average SNR value obtained from the plurality of STAs, the processor of the AP is further configured to:
  send a message to a second AP in the multi-AP environment; and
  send a steering request to the STA, wherein the steering request instructs the STA to join a Basic Service Set (BSS) of the second AP.

25. The non-transitory computer-readable medium of claim 24, wherein the message:
  indicates that the AP is reducing the transmission power to its BSS, and the SNR value for the STA is more than the defined percentage below or above the average SNR value obtained from the plurality of STAs within its BSS; and
  informs the second AP that the steering request instructs the STA to join the BSS of the second AP.

26. An access point (AP) for performing a transmission power adjustment operation in a multi-AP environment, comprising:
  one or more processors; and
  a memory storing instructions that, when executed by the one or more processors, cause the AP to:
    obtain one or more frames from a plurality of stations (STAs) within the multi-AP environment;
    determine an average SNR value based on the one or more frames obtained from the plurality of STAs; and
    compare the average SNR value to a threshold SNR value range;
      if the average SNR value exceeds the threshold SNR value range, reduce a transmission power to one or more of the plurality of STAs;
      if the average SNR value is below the threshold SNR value range, increase the transmission power to one or more of the plurality of STAs.

27. The AP of claim 26, wherein the threshold SNR value range is determined based on a modulation and coding scheme (MCS) index table.

28. The AP of claim 27, wherein if the average SNR value exceeds the threshold SNR value range, the one or more processors cause the AP to:
  select a different modulation scheme or a different coding scheme from the MCS index table.

29. The AP of claim 26, wherein the multi-AP environment is part of a self-organizing network (SON).

30. The AP of claim 29, wherein when the SNR value for a STA in the plurality of STAs is a defined percentage above or below the average SNR value obtained from the plurality of STAs, the one or more processors cause the AP to:
  send a message from to a second AP in the multi-AP environment; and
  send a steering request to the STA, wherein the steering request instructs the STA to join a Basic Service Set (BSS) of the second AP.

* * * * *